US006966431B2

(12) United States Patent
Jaynes et al.

(10) Patent No.: US 6,966,431 B2
(45) Date of Patent: Nov. 22, 2005

(54) CONVEYOR SYSTEM FOR ARTICLE TREATMENT

(75) Inventors: John H. Jaynes, Commerce, MI (US); David M. Stewart, Livonia, MI (US); Christopher L. Audia, Belleville, MI (US); Kelsey R. Schell, Brighton, MI (US); Robert H. Kubsik, West Bloomfield, MI (US); Melvin Edwards, Livonia, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 0 days.

(21) Appl. No.: 10/374,210

(22) Filed: Feb. 26, 2003

(65) Prior Publication Data

US 2003/0178286 A1 Sep. 25, 2003

Related U.S. Application Data

(60) Provisional application No. 60/359,684, filed on Feb. 26, 2002.

(51) Int. Cl.$^7$ .............................................. B65G 15/10
(52) U.S. Cl. .................................... 198/817; 198/465.4
(58) Field of Search ............................ 198/465.4, 817, 198/681, 687.1; 118/423, 428; 134/70, 124, 134/125

(56) References Cited

U.S. PATENT DOCUMENTS

| | | | |
|---|---|---|---|
| 1,528,557 A | * | 3/1925 | Luce ......................... 198/817 |
| 2,597,914 A | | 5/1952 | Whitworth et al. |
| 2,598,163 A | | 5/1952 | Halls |
| 2,598,201 A | | 5/1952 | Williams |
| 2,598,246 A | | 5/1952 | Fowler |
| 2,657,666 A | | 11/1953 | Fowler |
| 2,658,008 A | | 11/1953 | Williams et al. |
| 2,678,025 A | | 5/1954 | Straky |
| 3,952,699 A | | 4/1976 | Durr et al. |
| 4,062,437 A | | 12/1977 | Knapp |
| 4,738,353 A | * | 4/1988 | Johansson ................... 198/817 |
| 4,772,374 A | | 9/1988 | Urquhart et al. |
| 4,831,962 A | | 5/1989 | Gros |
| 4,874,639 A | | 10/1989 | Matsui et al. |

(Continued)

FOREIGN PATENT DOCUMENTS

AU           145298           2/1952

(Continued)

OTHER PUBLICATIONS

Patent application (17 pages) and drawing (8p ages) from pending U.S. Appl. No. 10/357,054, filed Feb. 3, 2003, entitled "Workpiece Treatment Systems And Conveyor Assembly," to Dehne et al.

*Primary Examiner*—James R. Bidwell
(74) *Attorney, Agent, or Firm*—Dickinson Wright PLLC

(57) ABSTRACT

A system for transporting articles along a treatment path in a treatment area. The conveyor system includes a conveyor and a plurality of pendulums. The conveyor includes first and second drive segments laterally spaced from and parallel to one another. The pendulums include first pendulums moving along the first drive segment and second pendulums moving along the second drive segments in aligned and opposed pairs. Further features of the invention include a guide assembly having a first element coupled to move with a carrier assembly and a second element engaging the first element to stabilize the rotational orientation of the carrier assembly. Other features of the present invention include a conveyor system configuration that facilitates transportation of articles about horizontal curves as well as a unique pendulum configuration particularly suited for use with the invention.

5 Claims, 10 Drawing Sheets

U.S. PATENT DOCUMENTS

| | | |
|---|---|---|
| 4,911,818 A | 3/1990 | Kikuchi et al. |
| 4,919,977 A | 4/1990 | Yamane et al. |
| 4,968,530 A | 11/1990 | Yamane et al. |
| 4,988,537 A | 1/1991 | Tanimoto et al. |
| 5,009,931 A | 4/1991 | Yamane et al. |
| 5,063,085 A | 11/1991 | Yamane et al. |
| 5,091,215 A | 2/1992 | Tanimoto et al. |
| 5,094,183 A | 3/1992 | Hamasaki |
| 5,100,705 A | 3/1992 | Yamane et al. |
| 5,104,682 A | 4/1992 | Nakahama et al. |
| 5,110,440 A | 5/1992 | Case |
| 5,115,758 A | 5/1992 | Suzuki et al. |
| 5,169,683 A | 12/1992 | Matsui et al. |
| 5,220,991 A | 6/1993 | Yamaguchi et al. |
| 5,242,044 A | 9/1993 | Yamaguchi et al. |
| 5,565,244 A | 10/1996 | Matsui et al. |
| 5,651,820 A | 7/1997 | Ogasawara et al. |
| 5,651,822 A | 7/1997 | Heckmann |
| 5,686,148 A | 11/1997 | Suzuki |
| 5,725,669 A | 3/1998 | Heckmann |
| 5,743,962 A | 4/1998 | Ogasawara et al. |
| 5,972,112 A | 10/1999 | Wood et al. |
| 6,070,636 A | 6/2000 | Zaher |
| 6,254,681 B1 | 7/2001 | Simon et al. |
| 6,372,107 B1 | 4/2002 | Besinger et al. |
| 6,374,993 B1 * | 4/2002 | Tetzloff .................. 198/465.4 |
| 6,419,983 B1 | 7/2002 | Kreuzer |
| 2001/0050046 A1 | 12/2001 | Nishida et al. |

FOREIGN PATENT DOCUMENTS

| | | |
|---|---|---|
| AU | 145299 | 2/1952 |
| DE | 1 922 751 | 11/1970 |
| DE | 25 12 762 A1 | 9/1976 |
| DE | 29 01 027 A1 | 7/1980 |
| DE | 32 17 553 | 10/1983 |
| DE | 41 10 149 | 10/1991 |
| DE | 43 04 145 C1 | 4/1994 |
| DE | 44 10 477 C1 | 9/1995 |
| DE | 44 32 352 A1 | 3/1996 |
| EP | 0 278 482 A1 | 8/1988 |
| EP | 0 360 301 A2 | 3/1990 |
| EP | 0 683 699 B1 | 2/1994 |
| GB | 644169 | 10/1950 |
| GB | 1019887 | 2/1966 |
| GB | 1395383 | 5/1975 |
| GB | 1434348 | 5/1976 |
| JP | 63-197584 | 8/1988 |
| JP | 4-145976 | 5/1992 |
| WO | WO 94/17926 | 8/1994 |
| WO | WO 98/15359 A1 | 4/1998 |
| WO | WO 01/17691 A1 | 3/2001 |
| WO | WO 02/060598 A1 | 8/2002 |

* cited by examiner

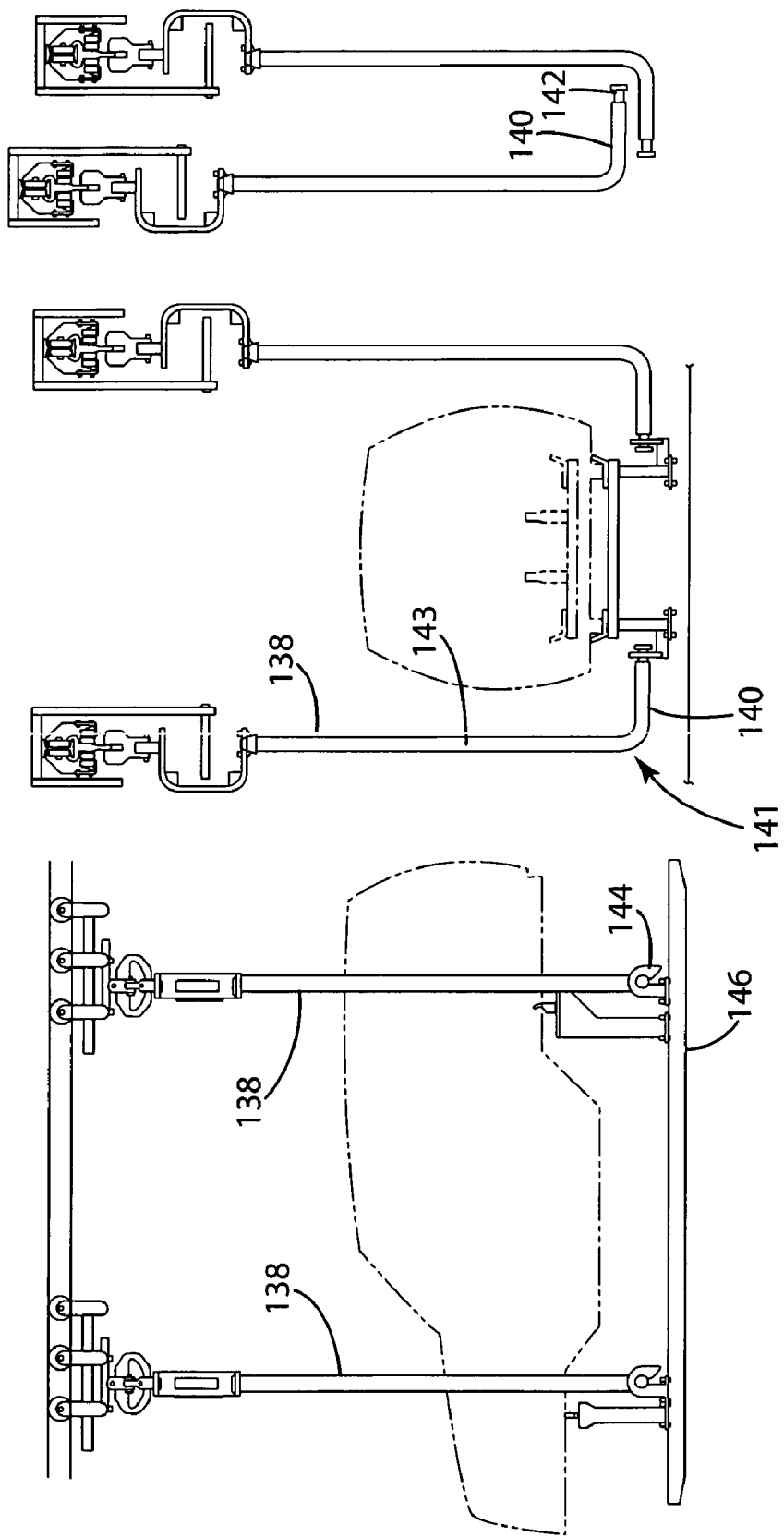

CONVEYOR SYSTEM FOR ARTICLE TREATMENT

CROSS-REFERENCE TO RELATED APPLICATION

This application claims the benefit of U.S. Provisional Application No. 60/359,684, filed Feb. 26, 2002, the entire disclosure of the application is considered part of the disclosure of this application and is hereby incorporated by reference.

BACKGROUND OF THE INVENTION

The present invention relates generally to a conveyor, installation, and method for moving articles and, more particularly, for moving articles, such as vehicle bodies, through a series of dip tanks.

Various conveyor systems are available to transport articles such as vehicle bodies through production areas. Of particular interest for the present invention are conveyor systems that move articles, such as vehicle bodies, through a series of dip tanks for treating the vehicle body prior to painting. Conveyor systems of this type are generally required to transport the vehicle body along the path of travel in a manner that supports the vehicle body in a variety of orientations relative to gravity, permit the lowering and raising of the body into and out of the dipping tanks without unduly lengthening the dip tanks, and prevent contaminants from contacting the vehicle body or the solution in which the body is dipped. Cost, space, and maintenance concerns are also important. While many of these concerns are addressed by available conveyor systems, the present invention provides numerous improvements and addresses other deficiencies in the art.

In one conventional system, pairs of pendulums are transported through a conveyor path by two separate and distinct conveyor chain loops. The pendulums have hooked lower ends that are releasably connectable to skids or carriers that support the vehicle body. In order to effectively transport the vehicle through the dipping tanks, the pendulums on each conveyor move in aligned pairs. As the position of the pendulums are fixed to move with its respective separate chain, this alignment is commonly achieved by a drive assembly that engages both of the separate and distinct chains. However, as each chain moves through a separate loop, each chain is subjected to different conveyor components, such as take-ups, lubricators, tracks, rollers for turns, and the like, as well as different tensions. Each of these different components give rise, both individually and in combination, to different stresses and generate differing forces that tend to deteriorate the separate chains over time. These forces in turn cause chain wear, such as a narrowing of the diameter of chain pins that intercouple adjacent links as well as a broadening of the pin passages in the chain links. Ultimately, the length of each chain changes at a different rate over the operational life of each conveyor. As the length of each chain changes, the pendulums tend to become misaligned.

A further disadvantage of the two conveyor system described above is the need for two separate return paths between the point that the vehicle bodies are unloaded and loaded. Due to the nature of the dipping environment, the pendulums are preferably passed through a cleaning station during the return path. With two separate return paths, one on each side of the travel path of the vehicle bodies, two separate cleaning stations are required.

Yet still another disadvantage of the prior art system described above is the inability of the separate conveyors to transport the vehicle body around horizontal turns. Due to space constraints and the length of the required dipping lines, it is common to have two or more parallel treatment paths through which each vehicle must pass. Without the ability to traverse horizontal turns, this prior art system, and other available prior art systems, require the vehicle body to be unloaded from the pendulums at the end of the first line, rotated 90 degrees, moved transversely into alignment with the second line, rotated an additional 90 degrees, and loaded onto the pendulums of the second pair of conveyors. The unloading from the first line, rotation, horizontal displacement, further rotation, and loading onto the second line requires a complex and expensive array of lifts, turntables, and roller tables. All of these components are required simply because existing pendulum conveyor systems cannot transport the vehicle bodies around horizontal curves. Accordingly, a pendulum conveyor system capable of transporting an article, such as a vehicle body, through the treatment areas as well as horizontal curves would greatly simplify the transporting operation and result in significant cost savings.

The inability of prior art systems to traverse horizontal curves results in part from the chording of the spaced pendulums on each conveyor and the need to maintain alignment of the pendulum pairs. More particularly, the pendulums coupled to the front and rear of the vehicle carrier are spaced at a predetermined distance from one another and fixed to move with the conveyor chains. This spacing creates a chordal distance between adjacent pendulums on each of the spaced and separate chains that cannot be effectively accommodated in a horizontal turn. Moreover, while the spaced conveyors must move at the same speed in straight sections to maintain pendulum alignment, as the arc length of the inner and outer conveyors differ in a horizontal turn, the outer conveyor must move at a greater speed than the inner conveyor during the turn.

SUMMARY OF THE INVENTION

The present invention is directed to an installation for conveying articles through a dipping tank and to a conveyor and method for conveying such articles. The invention includes numerous embodiments including an installation and conveyor using a single chain to transport pendulums in spaced apart and aligned pairs through treatment areas. The single chain conveyor embodiment provides numerous cost and efficiency benefits when compared to the prior art.

The invention is further directed to conveyor embodiments using a single pair of aligned and spaced pendulums to support the object in combination with a guide assembly to stabilize and control the rotational position of the object and/or selectively rotate the object at desired locations within the installation. Two separate embodiments of the guide assembly are described and illustrated herein including a guide cam and track arrangement as well as a third pendulum arrangement. These guide assemblies may be used either with the single chain embodiment of the invention described above or with commonly used conveyor systems comprising two separate and distinct chain loops. Moreover, the invention is sufficiently flexible in structure and operation to permit the use of a variety of driving mechanisms such as direct drive chains, power and free conveyor assemblies, and the like.

A still further feature of the present invention is an embodiment that permits the articles to be transported around horizontal curves using the same pendulums that support the article through linear segments of the treatment area.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 10 is a side elevational view of a conveyor system having an alternative pendulum configuration and mechanism for mounting the pendulums to the carrier;

FIG. 11 is a rear elevational view of the conveyor system and pendulum arms shown in FIG. 10;

FIG. 12 is an elevational view taken along the return path of the conveyor system illustrated in FIGS. 10 and 11;

DETAILED DESCRIPTION OF THE PREFERRED EMBODIMENT

The present invention will now be described in detail with reference to attached FIGS. 1–16. While the following description relates in part to a single chain conveyor system, those skilled in the art will appreciate from this description that several of the embodiments of the invention, as well as the advantages attendant thereto, may be used in systems using two separate conveyors. Moreover, various modifications may be made to the described embodiments without departing from the proper scope of the invention.

Figure 1:
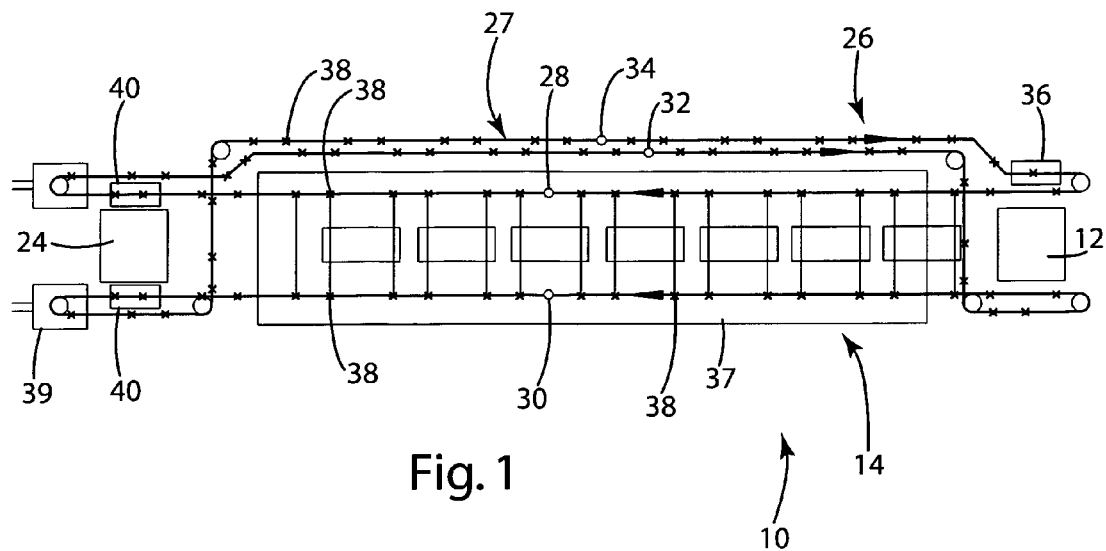
FIG. 1 is a plan view of the invention using a single conveyor chain to transport articles through a treatment installation.

FIG. 1 illustrates a treatment installation 10 having a load station 12 wherein articles such as vehicle bodies may be loaded onto the conveyor system for transport through a first treatment area 14. The vehicle bodies may be subjected to numerous treatment operations. For example, as will be further described, the vehicle bodies may be dipped in solutions for the preparation of the body for painting. An unload station 24 is provided at the downstream end of the treatment area 14 where the vehicle bodies are unloaded from the conveyor system and transported for additional processing.

The conveyor system 26 includes a single conveyor 27 having first and second laterally spaced drive segments 28 and 30 and first and second return segments 32 and 34. The second return segment 34 is shown to pass through a cleaning station 36 where selected conveyor system components, including the pendulums 38 suspended from the conveyor chain or tracks, are cleaned. The pendulums 38 are coupled to move with the conveyor chain and are spaced from one another such that the pendulums are oriented in one or more opposed pairs between the load station 12 and unload station 24, i.e., the treatment area. In the embodiment illustrated in FIG. 1, one pendulum pair is positioned to operatively engage the fore part and one pair the rear part of each carrier frame to support the vehicle. The vehicles are passed through vertical curves to lower and raise the transported articles into and out of one or more dip tanks 37 within the treatment area. While the conveyor system 26 of FIG. 1 may include any number of non-illustrated system and conveyor components generally used in the art, the system is shown to include a positioning take-up 39, commonly available in the art, to alter the overall length of the single conveyor chain so that the opposed pairs of pendulums are properly aligned. Drives 40 are positioned in appropriate locations to drive the conveyor chain.

The advantages of a treatment installation 10 having a conveyor system 26 with a single conveyor such as that illustrated in FIG. 1 are numerous. For example, a single chain permits the use of a single chain drive 40 or, depending on loading, multiple chain drives that engage the single chain. As all of the pendulums 38 are driven by the single chain, the pendulums are assured to travel at the same speed. Conversely, conveyor systems using two separate and distinct conveyors must include a mechanism to ensure that the chains are driven at the same speed. Thus, it is common in the art to include a common drive that engages both of the chains. Such drives are generally expensive and do not ensure the continued alignment of the pendulums over time. More particularly, as each of the separate conveyor loops are subjected to different rates of wear, the chains elongate at different rates thereby sacrificing coordinated movement of the pendulums over time. In the single conveyor design, all of the components of the single chain are subjected to the same forces that tend to cause wear. Therefore the coordinated movement of the pendulums is maintained throughout the operational life of the system.

The single conveyor arrangement of the present invention also eliminates the need for duplicate conveyor system components, such as separate take-ups, lubrication mechanisms, and the like, that are required in a two conveyor system. The resulting cost savings are further enhanced by reductions in maintenance costs and overall simplicity. Moreover, as all of the pendulums in the single conveyor arrangement pass each point in the system, a single cleaning station may be used. Other advantages will be readily apparent to those skilled in the art based upon this description.

Figure 2:
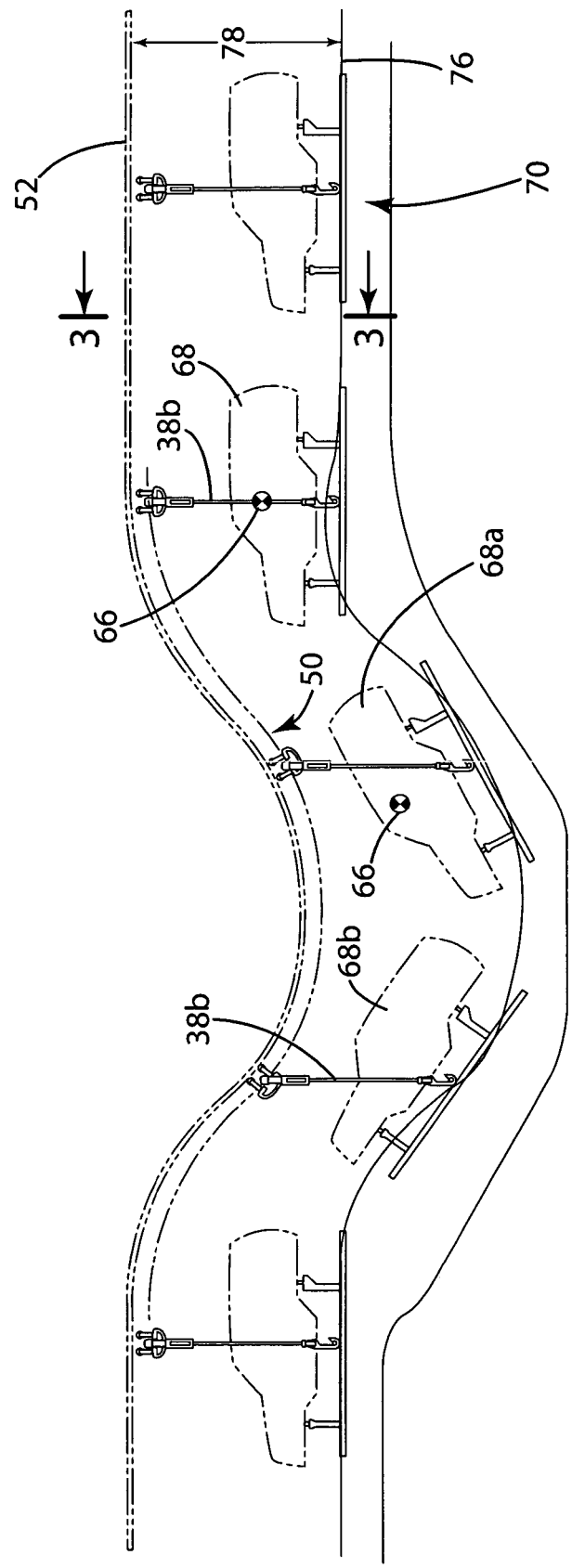
FIG. 2 is side elevation view of a second embodiment of the present invention using a single pair of pendulums to support the article and a guide assembly including a guide cam and track.
Figure 3:
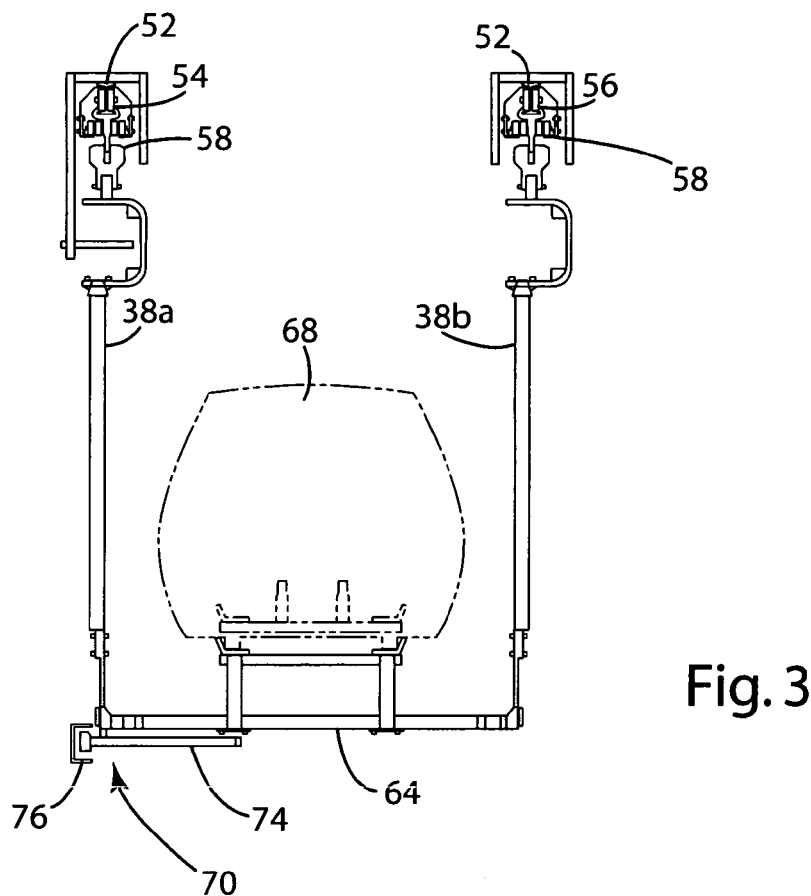
FIG. 3 is a rear elevational view taken along the line 3—3 shown in FIG. 2.

FIGS. 2 and 3 illustrate another embodiment of the present invention which may be used with the single conveyor arrangement described above or with the two separate conveyors presently used in the art. Just as with the conveyor system 26 shown in FIG. 1, the conveyor system 50 shown in FIGS. 2 and 3 is illustrated as a monorail conveyor having laterally spaced conveyor tracks 52 (FIG. 3), such as the illustrated "I"-beam, that support laterally spaced drive chain segments 54 and 56. Support trolleys 58 are preferably fixed to move with the drive chain segments and a pivot coupling couples the trolleys to the upper end of the respective pendulums 38a and 38b. The lower ends of the pendulums are coupled to a carrier 64, preferably through a locking pivot coupling such as is generally known in the art. It should be appreciated that the chain and trolley assembly illustrated in FIG. 3 and generally described herein is but a single representative illustration of a variety of conveyor systems that may be used with the present invention. In fact, as alluded to above, the present invention (including the embodiment discussed above with reference to FIG. 1) may use a variety of conveyor systems generally known in the art including other chain conveyors, such as power and free conveyors, as well as non-chain based conveyors such as belt conveyors and electrified monorails.

As is shown in FIGS. 2 and 3, the pendulums 38a and 38b are aligned in pairs and are preferably coupled to the carrier 64 proximate to, and even more preferably slightly forward of, the center of gravity 66 of the carrier 64 and conveyed article 68. By this arrangement, a single pair of pendulums provide the primary load support for the conveyed article and carrier. A guide assembly 70 is provided forward or rearward of the pendulum connection points, preferably rearward as illustrated, to stabilize the carrier and to selectively permit changing of the rotational position of the article and carrier. In the illustrated embodiment, the guide assembly 70 includes a guide member 74 fixed to, and projecting laterally outward from, the frame of the carrier 64 and a guide rail or track 76 within which the guide member is disposed for movement (FIG. 3). The guide member 74 may include any number of mechanisms that will be readily apparent to those skilled in the art based upon this description including, for example, a cam, pin, roller, or the like. Moreover, the specific material of the guide member 74 and track 76 may vary depending upon the anticipated loads and the operating environment. In general, it is anticipated that a stainless steel track and plastic guide member may be appropriate for the application discussed herein.

The interaction of the guide member 74 with the guide rail or track 76 stabilizes the carrier frame and article against undesirable rotation. A further benefit of the guide mechanism of the present invention is the ability to vary the vertical separation 78 (FIG. 2) between the conveyor track 52 and the guide rail or track 76 to induce a desired change in the angular position of the carrier and article. Induced rotation may be beneficial in a number of ways. For example, the article and carrier may be rotated in a counterclockwise direction (FIG. 2) when the vehicle body 68a is entering the dip tank and pivoted in a clockwise direction when the vehicle 68b is exiting the dip tank. The rotation facilitates the entering and exiting of the vehicle bodies into and from the dipping solution and assists in decreasing the required spacing between vehicles. Consequently, the present invention may permit space and cost savings such as by the use of smaller dipping tanks or closer spacing of vehicles. Moreover, a specific rotational orientation may facilitate drainage of the solution from the vehicle as the vehicle exits the dip tank.

Figure 7:
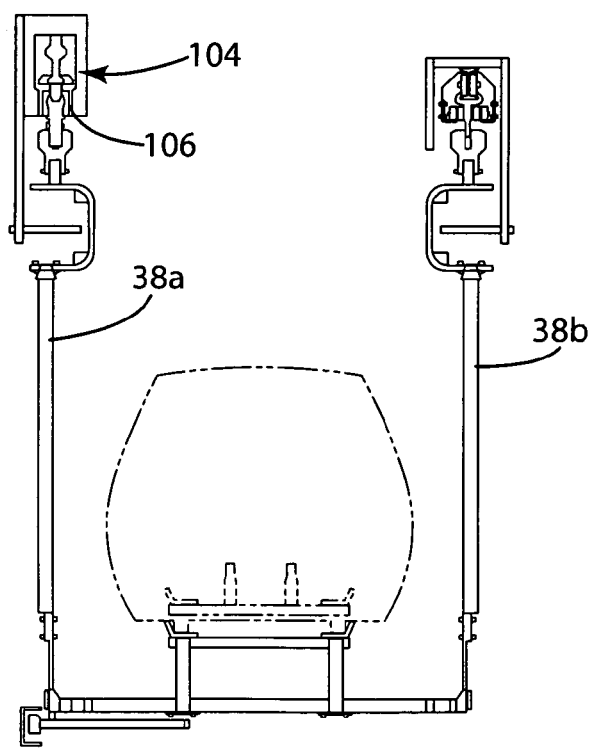
FIG. 7 is a rear elevational view similar to that shown in FIG. 3 illustrating another embodiment of the present invention using a single pair of pendulums and a guide assembly to facilitate article movement through horizontal curves.

The conveyor system illustrated in FIGS. 2 and 3, as noted above, may be used with a single conveyor described with reference to FIG. 1 as well as with two separate conveyors as is common in the art. Moreover, while the conveyor system 50 is shown as a monorail in FIGS. 2 and 3 with the drive chain directly driving the trolleys 58, alternative drive mechanisms including different chain conveyors as well as non-chain driven conveyor systems may be used without departing from the scope of the invention. By way of example rather than limitation, and as shown in FIG. 7, power and free conveyor assemblies may be used and, in certain instances, may provide additional benefits as hereinafter described.

Figure 4:
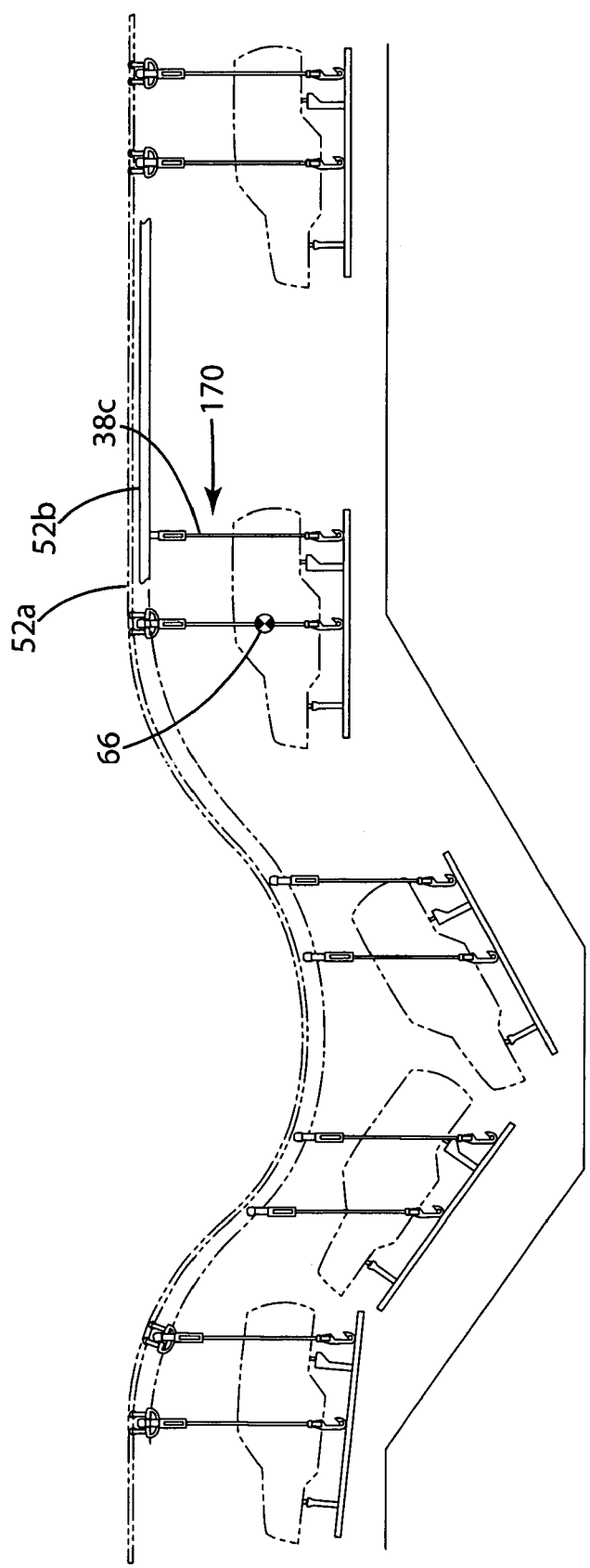
FIG. 4 is a side elevational view of another embodiment of the present invention using a single pair of supporting pendulums to support the article and a guide assembly that includes a third pendulum.

FIG. 4 illustrates another embodiment of the present invention using single pairs of pendulums 38a and 38b again positioned proximate to the center of gravity 66 of the carrier and vehicle in the manner shown in FIGS. 2 and 3. The embodiment shown in FIG. 4 includes an alternative guide assembly 170 which illustrates not only the nature of the alternative but also the fact that those skilled in the art will understand that various modifications may be made to the embodiments described in FIGS. 2–4 without departing from the scope of the invention. As shown in FIG. 4, the alternative guide assembly 170 includes a third pendulum 38c to stabilize the rotational orientation of the carrier and workpiece relative to the conveyor. The third pendulum 38c, while illustrated as being positioned on the left side of each of the carriers transported through the system, may be alternately disposed on the right and left sides of adjacent carriers in a single conveyor chain configuration. Alternating the position of the third pendulum 38c is particularly advantageous in systems using a single drive conveyor as described with reference to FIG. 1. More particularly, by alternating the position of the third pendulum to engage opposite sides of adjacent carriers, the pitch between repeating pendulums is shortened and thereby permitting a shorter length chain loop on the positioning take-up to properly orient the pendulum arms.

Further, the third pendulum 38c may be supported by the same conveyor track 52a as one of the pendulums 38a and 38b or, alternatively, a separate track 52b with free trolleys riding therein may be provided to separately support the third pendulum. In the latter instance, the vertical profile of the track 52a supporting the conveyor chain and the track 52b supporting the free trolley may be varied to provide differing vertical separation to achieve the selected rotation in a manner similar to that described above with reference to FIGS. 2 and 3. Disposing the third pendulums 38c in a separate track 52b also permits the conveyor to transport the pendulum arms around horizontal turns as described in greater detail below. It should be appreciated that the configuration shown in FIG. 4 may also be used to traverse horizontal curves such as in the manner described with reference to FIGS. 5–7 by supporting the third pendulum in the free trolley track of a power and free conveyor.

Figure 5:
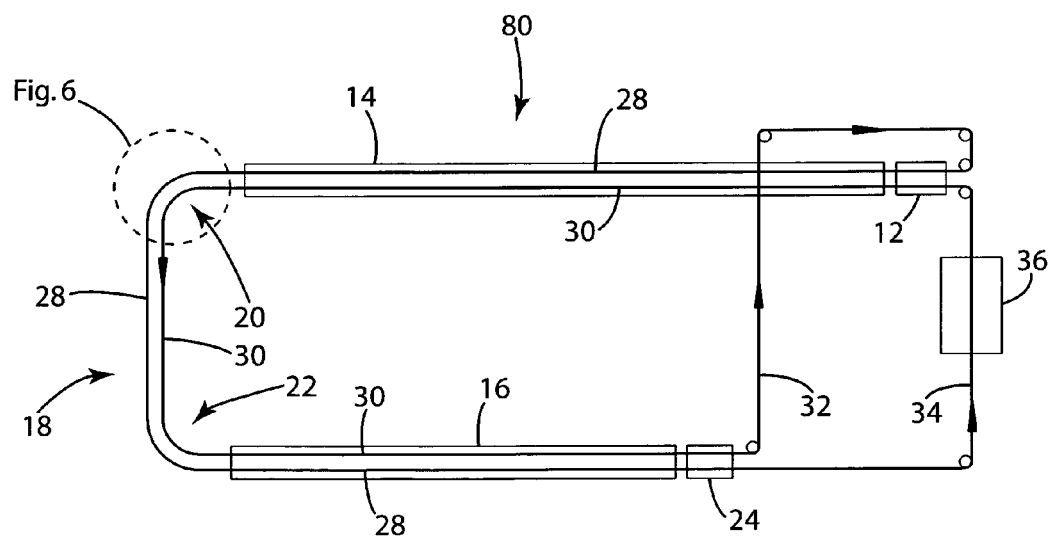
FIG. 5 is a plan view of a treatment installation using the present invention wherein the conveyor system transports vehicles about horizontal curves.

FIG. 5 provides a plan view of a treatment installation using the present invention wherein the conveyor system is capable of transporting the pendulums in aligned pairs in linear conveyor segments and around horizontal curves. Like FIG. 1, the installation 80 shown in FIG. 5 includes a load station 12 and first treatment area 14. However, the installation 80 also includes a second treatment area 16 and transfer area 18. The transfer area interconnects the first and second treatment areas in a manner that permits the vehicle bodies to be translated around first and second horizontal curves 20 and 22. The unload station 24 is provided at the downstream end of the second treatment area 16.

Figure 6:
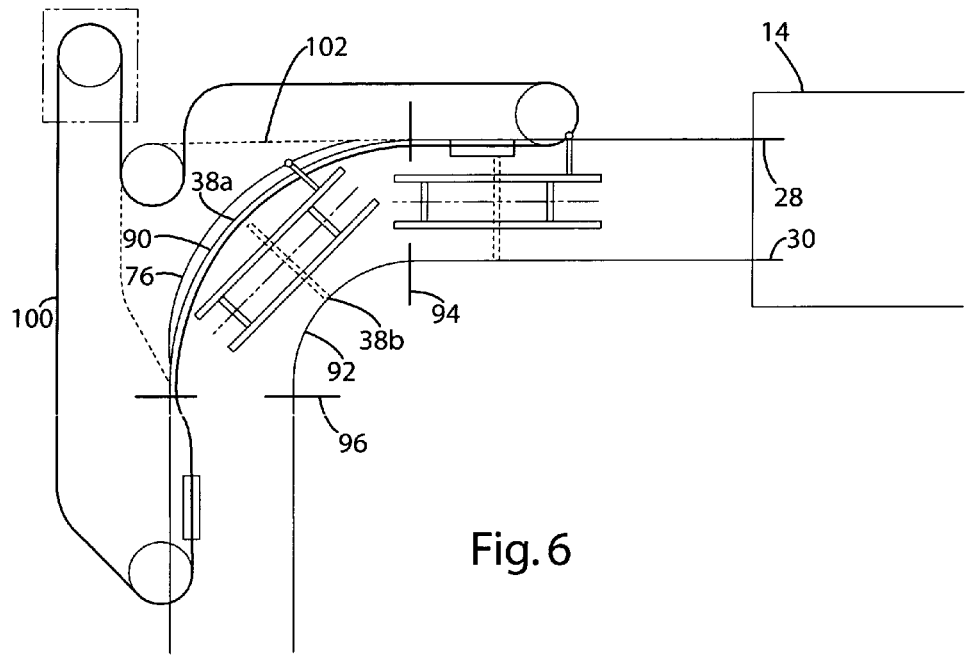
FIG. 6 is a plan view of the conveyor system along a horizontal curve shown in FIG. 5.

Two separate embodiments of a conveyor system for traversing the horizontal curves in an installation 80 are described below with reference to FIGS. 6–7 and 8–9, respectively. As is shown in FIGS. 6 and 7, the articles in the first treatment area 14 are conveyed along a first linear drive paths 28 by pendulums 38a and a second linear drive path 30 by pendulums 38b. The pendulums 38a and 38b are aligned with one another and move at the same speed. The linear drive paths transition into outer and inner curve segments 90 and 92 at the point of curvature 94 of the horizontal curve. The outer and inner curve segments 90 and 92 extend to a point of tangency 96 whereupon the articles are again moved along spaced linear drive paths. As the distance along the outer curve segment 90 is greater than the inner curve segment 92, the pendulums 38a moving along the outer segment 90 must move at a greater speed than the pendulums 38b on the inner curve in order to maintain the pendulums in proper alignment. The conveyor system 82 transports the vehicles and carriers around horizontal turns by providing a separate conveyor, e.g., a power and free conveyor, along the first linear drive segment 28 and outer curve segment 90. The power and free conveyor 104, as is generally known in the art, includes a power chain that is releasably engageable with a free trolley 106 that supports the pendulum 38b (FIG. 7). The trolley is passed between a first drive chain 102 that engages the trolley in the linear segments to a high speed conveyor chain 100 that moves the trolley around the outer curve segment 90.

In the representative conveyor layout illustrated in FIG. 6, the power chain 102 departs from the outer curve segment at the point of curvature 94 to release the trolley 106. The conveyor 102 is positioned to re-engage the free trolley supporting the pendulums 38a at the point of tangency 96. The high speed conveyor 100 is positioned such that its pusher dogs engage the pendulum supporting trolleys 106 at the point of curvature 94 and remain in engagement until a position proximate to the point of tangency 96.

The conveyor that drives the pendulums 38b along second linear drive path 30, which may consist of virtually any conveyor generally known in the art including direct drive and power and free conveyors, continues along the inner curve segment 92 and moves at the same speed as the slower moving conveyor 102 to provide uniform movement of pendulums 38a and 38b along the linear sections of the treatment area and transfer area. Thus, while the two pendulums 38a and 38b move at the same speed in the linear sections of the conveyor path, the alignment of the pendulums is maintained in the horizontal curve due to the high speed chain 100 driving the outer pendulums 38a at a greater speed than the movement of the inner pendulums 38b. The speed of the high speed chain 100 is determined such that the pendulums are maintained in alignment throughout the horizontal curve and at the point of tangency 96.

Those skilled in the art will appreciate that various modifications to the conveyor system 82 described with reference to FIGS. 6 and 7 may be made without departing from the present invention. For example, while the invention is described as including a higher speed conveyor 100 for transporting the outer pendulums around the outer segment of the horizontal curve, a slower speed conveyor may alternatively be used to transmit the inner pendulums 38b around the inner curve.

In order to accommodate the chording of the carrier frame within the horizontal curve, the guide track 76 is radially or laterally offset from the outer conveyor segment 90 within the horizontal curve. This offset accommodates the radial movement of the rearward end of the carrier relative to the carrier center around the horizontal turn. It should be appreciated that this arrangement for traversing horizontal curves may be used with the guide mechanism described in FIGS. 2 and 3 as well as that shown and described with reference to FIG. 4. With reference to the embodiment described in FIG. 4, to traverse horizontal curves, the third pendulum 38c is preferably disposed within the separate third rail 52b and driven by a separate drive chain moving at the same speed as the conveyor driving pendulum arms 38a. By this configuration, the present invention eliminates the need for various lift mechanisms, roller tables, horizontal transfers, and turntables that are commonly used in the art to transfer articles between parallel treatment paths as noted above with reference to FIG. 5.

Figure 8:
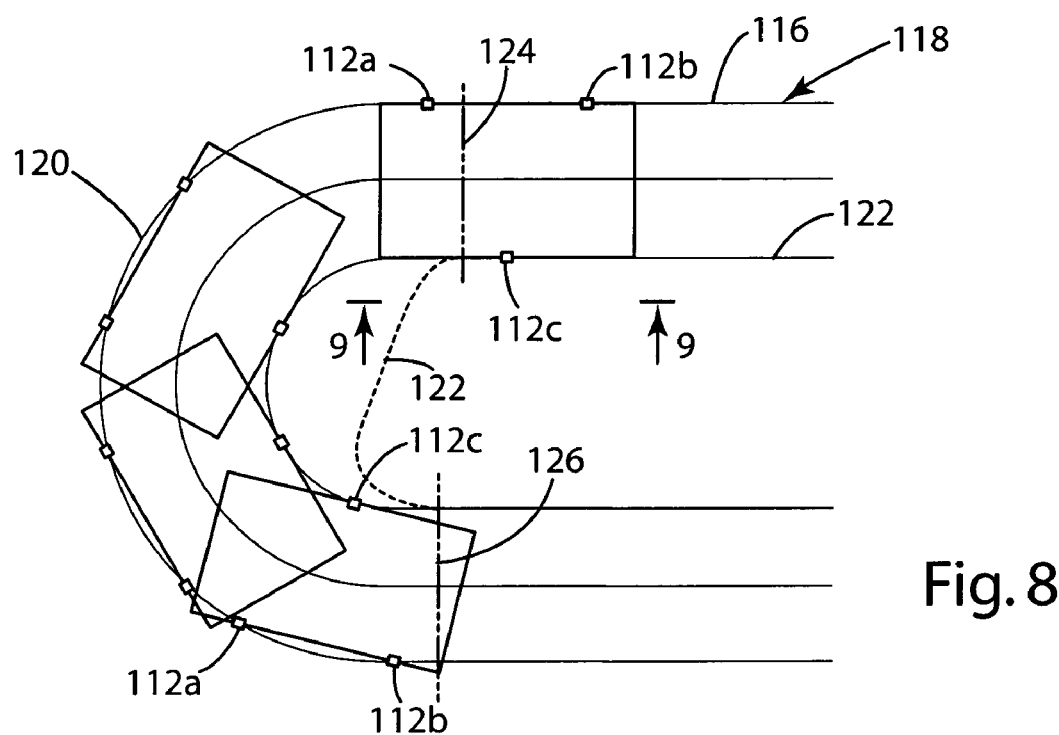
FIG. 8 is a top plan view of an alternate dipping installation for transporting articles through treatment areas and about horizontal turns.
Figure 9:
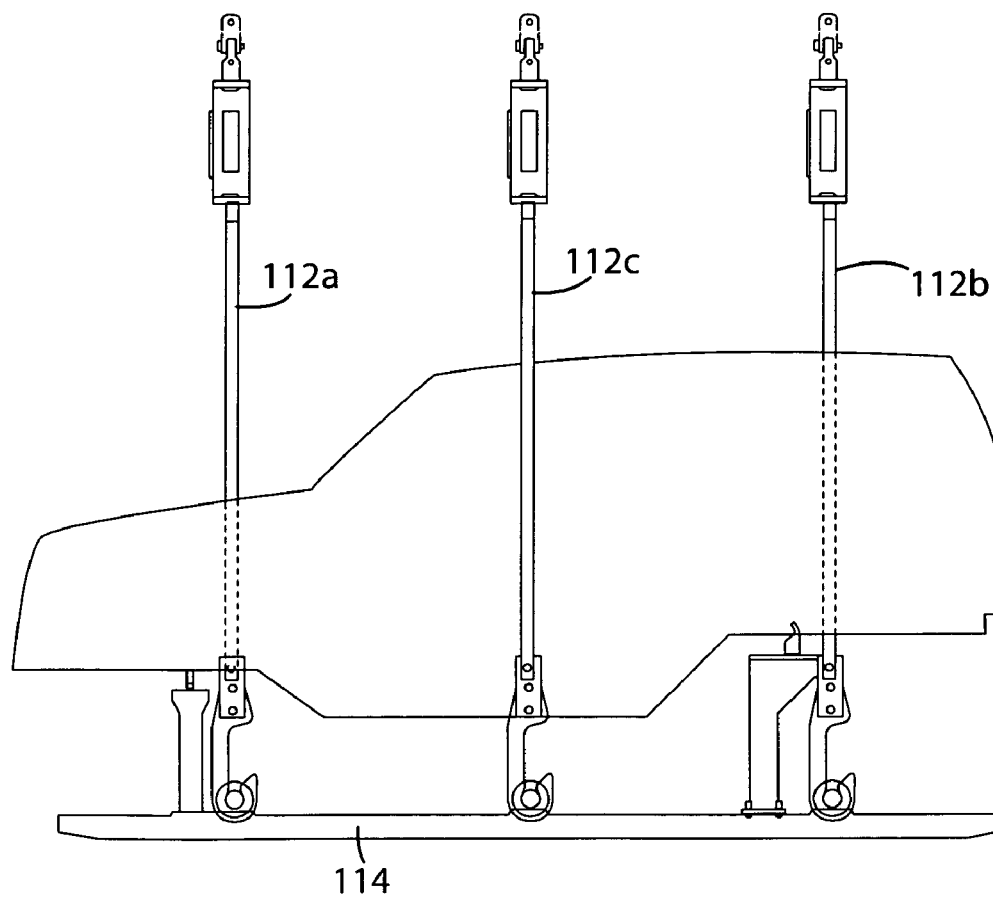
FIG. 9 is a side elevational view taken along the line 9—9 shown in FIG. 8.
Figure 13:
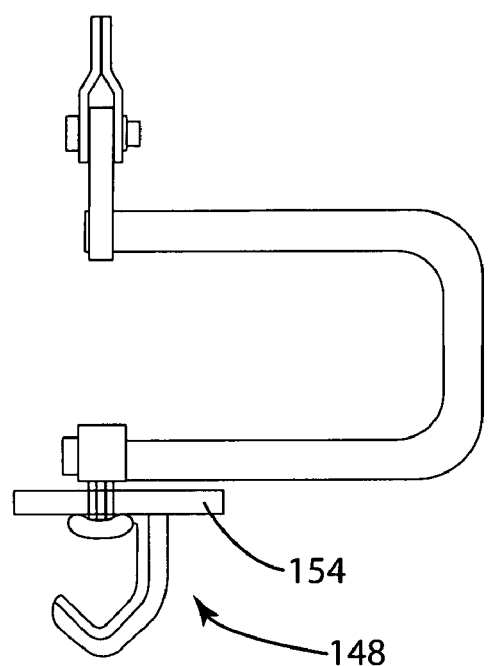
FIG. 13 is an elevational view of a rotatable connector for coupling the pendulums to the conveyor.

An alternative conveyor system 110 for transporting articles through horizontal curves is illustrated in FIGS. 8 and 9. In this embodiment, three pendulums 112a, 112b and 112c are again used to support each carrier with pendulums 112a and 112b positioned proximate the front and rear of each carrier 114 on the side of the outer segment of the curve and one pendulum 112c located proximate the center of the carrier on the side of the inner curve segment. The conveyor system 110 includes a conveyor 116 to drive the pendulums 112a and 112b through the linear segment 118 and outer turn segment 120. A second conveyor 122 drives the pendulum 112c through linear segment before the curve, is wiped off at the point of curvature 124, and re-engages the pendulum 112 at the point of tangency 126. While the conveyor 116 can include virtually any available conveyor, including a direct drive monorail, the conveyor 122 is releasably engageable with the pendulum. Accordingly, the conveyor 122 is preferably a power and free conveyor with each pendulum 112b being supported by a free trolley, however, other releasable conveyors may be used without departing from the invention.

In order to assist the movement of the pendulums, carrier, and vehicle around the horizontal curve, the pendulums 112a and 112b may be intercoupled by a load bar. Further, a coupling for connecting the load bar may permit rotation and pivoting of each pendulum relative to the conveyor. The permitted rotation minimizes the chording effect of the pendulums 112a and 112b while the freedom to pivot assists the transportation of the pendulums and loads through vertical curves. By this arrangement, the conveyor system 110 permits articles supported by pendulums to be transported through horizontal curves without the need for a separate high speed conveyor.

The pendulums 38 and 112 are described and illustrated above as having a hook shaped lower end for engaging arms extending laterally from the carrier as is commonly used in the art. However, a variety of alternative pendulum lower end configurations may be used. One particularly beneficial arrangement is shown in FIGS. 10–12 to include pendulums 138 having a generally "L" shape with a leg 140 extending laterally from the lower end 141 of the vertical arm 143. An engagement mechanism 142 is provided on the leg 140 and adapted to cooperate with a coupling mechanism 144 mounted to the carrier 146 to couple the lower end of the pendulum to the carrier. This arrangement eliminates the need for laterally projecting arms on the carrier thereby permitting the use of narrow carriers. As the carrier is commonly transported with the vehicle body through various processing areas other than the vehicle dipping treatment areas, the narrowed profile of the carrier permits space savings that may be realized outside the dipping treatment areas.

Figure 14:
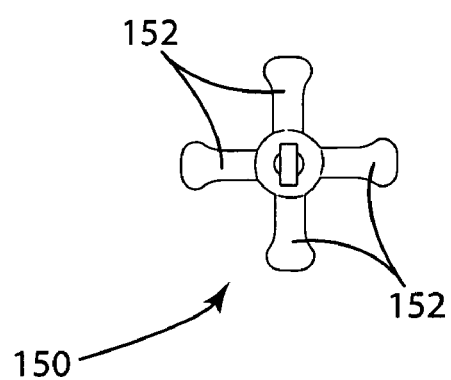
FIG. 14 is a top plan view of an indexing mechanism for rotating the connector shown in FIG. 13.
Figure 15:
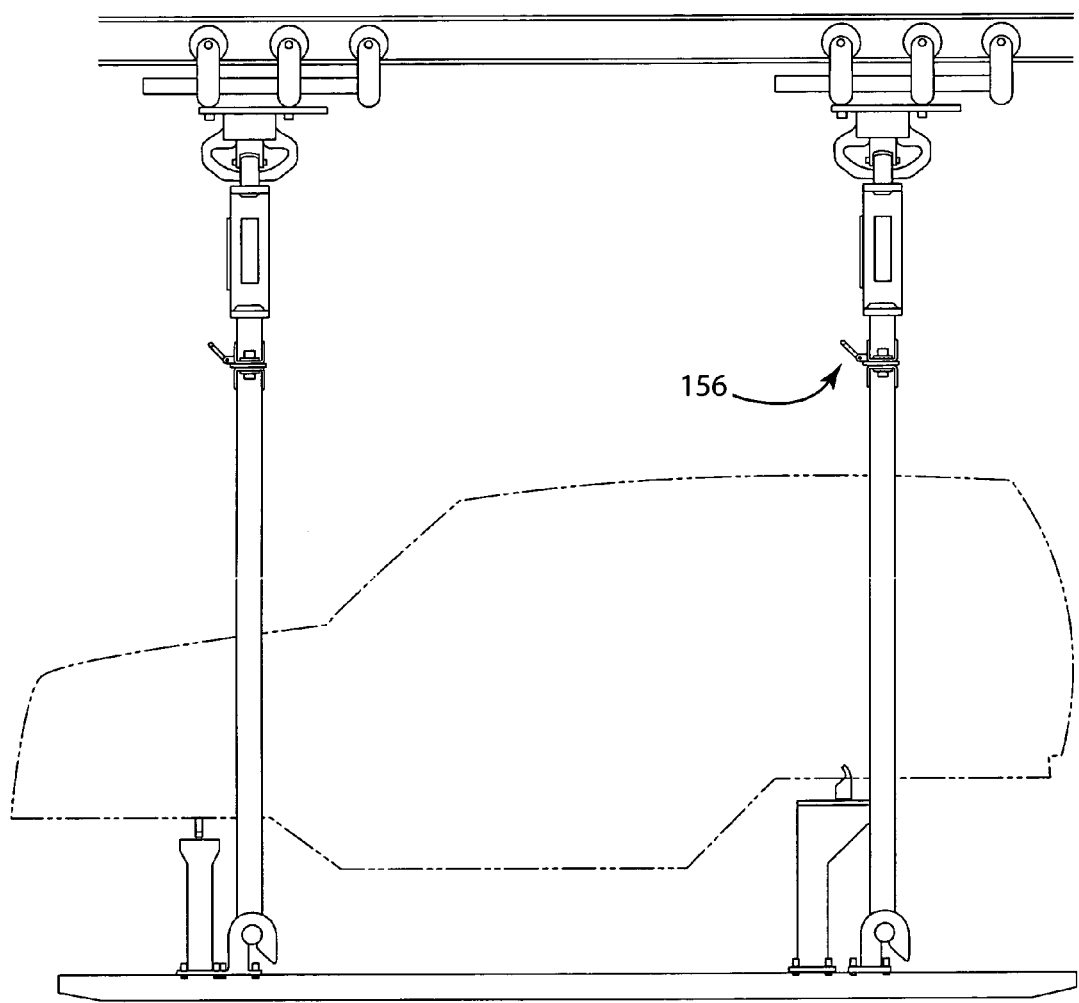
FIG. 15 is a side elevational view of a conveyor system having an alternative rotational swivel connection and locking feature.

Due to the non-symmetrical shape of the "L" pendulums, the pendulums are counterbalanced to hang vertically from the conveyors. Additionally, in order to facilitate use of the "L" shaped pendulums in the single conveyor installations such as that described with reference to FIG. 1, the pendulums include a rotatable connection such as the swivel hook 148 illustrated in FIG. 13 to permit controlled rotation of the pendulum such that the leg 140 on each pendulum faces inward toward the carrier 146 prior to picking up the carrier at the load station. To induce pendulum rotation, the conveyor system includes a rotation mechanism, preferably placed near the load station. While a variety of such rotation mechanisms are generally known in the art, a representative mechanism 150 is illustrated in FIG. 14 to include a star wheel indexing swivel having legs 152 to engage a cooperating indexing arm 154 on the swivel 148. It should be appreciated that other swivel mechanisms may be used. An exemplary locking swivel connection 156 is shown in FIG. 15. Finally, as is shown in FIG. 12, the pendulums 138 may be vertically offset from one another along the return path to save space.

Figure 16:
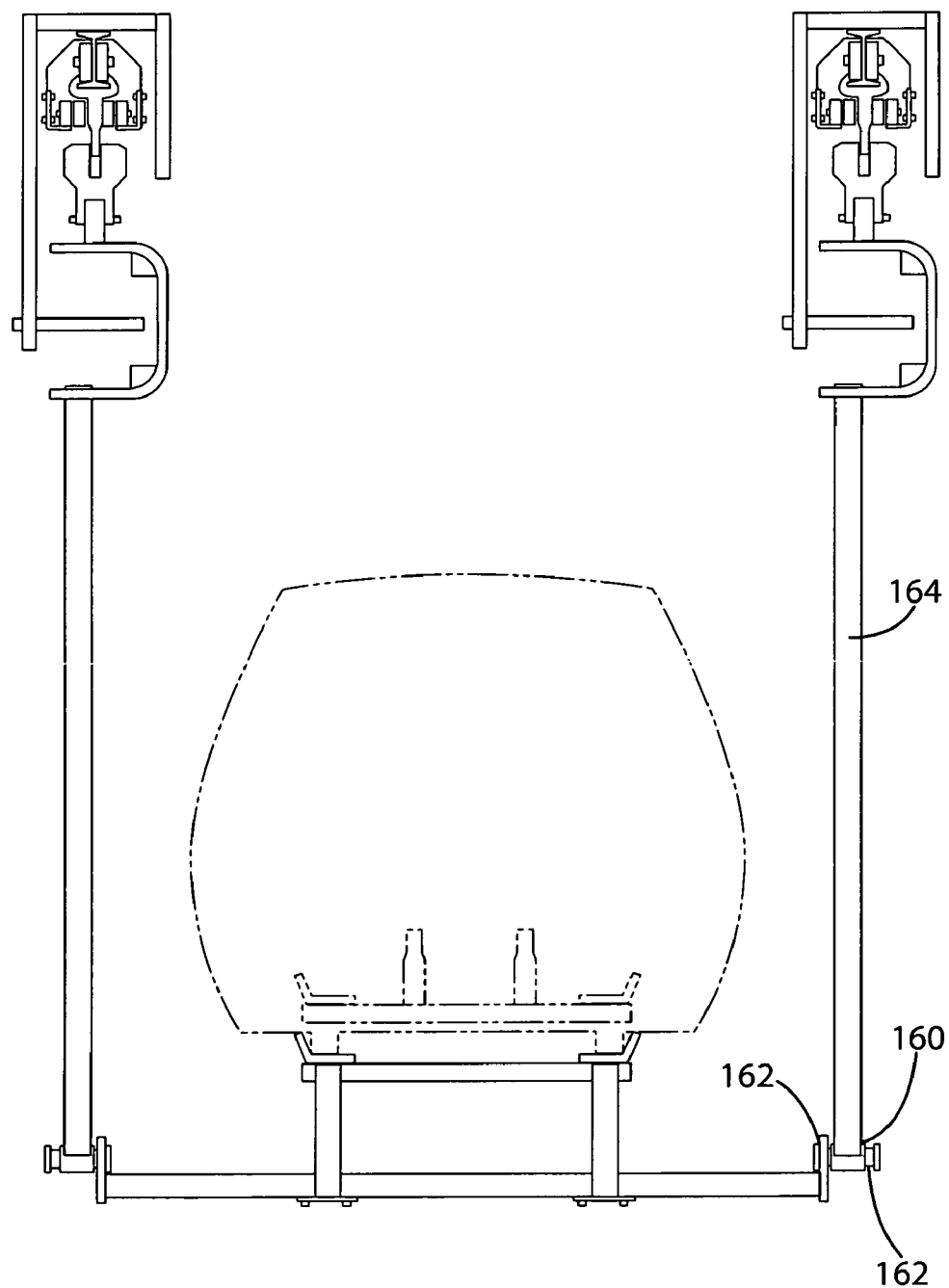
FIG. 16 is a rear elevational view of a conveyor system having an alternative "T" shape connection mechanism on the lower end of the pendulum.

While the "L" shaped pendulum configuration is illustrated in FIGS. 10–12 with a four pendulum and single conveyor system such as that shown in FIG. 1, those skilled in the art will appreciate that this pendulum configuration may be used with the alternative conveyor systems described herein including, but not limited to, multiple conveyor loop systems. Moreover, FIG. 16 illustrates yet another alternative configuration for the lower end of the pendulums for supporting engagement with the carrier. In this configuration, the lower end of each pendulum includes a cross-member 160 having an engagement mechanism 162 on each side of the vertical arm 164 of the pendulum. By providing the engagement mechanism for coupling the pendulum arm to the frame on each side of the pendulum, the embodiment illustrated in FIG. 16 eliminates the need to rotate the pendulums into a specific orientation when all of the pendulums are suspended from a single conveyor. The engagement mechanism 162 is generally shown to include a reduced diameter section that cooperates with the mounting assembly on the carrier in a manner known in the art to couple the pendulum to the carrier. The reduced diameter section is preferably configured to prevent floatation of the carrier relative to the pendulums when the carrier is disposed in the dip tank, particularly when entering or exiting the tank. Notwithstanding this general description, those skilled in the art will appreciate that a variety of alternative configurations may be used without departing from the scope of the invention.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A conveyor system for transporting articles along a treatment path in a treatment area, comprising:
   a conveyor forming a closed drive loop that includes a first drive segment, a second drive segment, a first return segment and a second return segment, wherein said second drive segment is laterally spaced from and parallel to said first drive segment in the treatment area, and said first and second return segments are substantially located outside the treatment area, said first and second return segments each including a portion substantially parallel to said first and second drive segments; and
   a plurality of first and second pendulums each coupled to move with said conveyor, the first pendulums moving along said first drive segment and the second pendulums moving along said second drive segment, one of said first pendulums and one of said second pendulums defining an aligned and opposed pair of pendulums in the treatment area.

2. The conveyor system of claim 1 wherein said first and second return segments each include a portion approximately perpendicular to said first and second drive segments.

3. The conveyor system of claim 1 wherein said first and second return segments are jointly spaced in close proximity to one of said first and second drive segments.

4. The conveyor system of claim 3 wherein said first and second return segments are approximately parallel.

5. The conveyor system of claim 1 wherein said first and second return segments each cross said first and second drive segments.

* * * * *